(12) United States Patent
Okada et al.

(10) Patent No.: US 7,021,053 B2
(45) Date of Patent: Apr. 4, 2006

(54) OPERATION MECHANISM OF A VARIABLE DISPLACEMENT HYDRAULIC PUMP

(76) Inventors: Hideaki Okada, 2-18-1, Inadera, Amagasaki-shi Hyogo (JP) 661-0981; Koji Irikura, 2-18-1, Inadera, Amagasaki-shi Hyogo (JP) 661-0981

(*) Notice: Subject to any disclaimer, the term of this patent is extended or adjusted under 35 U.S.C. 154(b) by 0 days.

(21) Appl. No.: 11/169,590

(22) Filed: Jun. 30, 2005

(65) Prior Publication Data

US 2005/0235639 A1  Oct. 27, 2005

Related U.S. Application Data

(63) Continuation of application No. 10/392,305, filed on Mar. 20, 2003, now Pat. No. 6,968,686, which is a continuation-in-part of application No. 09/901,656, filed on Jul. 11, 2001, now Pat. No. 6,536,212.

(51) Int. Cl.
 *F16D 31/02* (2006.01)
(52) U.S. Cl. .......................... 60/469; 60/487; 92/12.2
(58) Field of Classification Search ................ 92/12.1, 92/12.2, 13.8; 60/469, 487
See application file for complete search history.

(56) References Cited

U.S. PATENT DOCUMENTS 4,087,970 A  5/1978  Slazas et al.
4,912,999 A  4/1990  Franks et al.
6,073,443 A  6/2000  Okada et al.
6,199,380 B1  3/2001  Ishii
6,536,212 B1  3/2003  Irikura et al.
2004/0011195 A1*  1/2004  Okada et al. ................ 92/12.2

FOREIGN PATENT DOCUMENTS

JP  3-69755  7/1991
JP  5-302673  11/1993
JP  6-12318  3/1994
JP  7-16138  4/1995

* cited by examiner

Primary Examiner—Edward K. Look
Assistant Examiner—Michael Leslie
(74) Attorney, Agent, or Firm—Sterne, Kessler, Goldstein & Fox P.L.L.C.

(57) ABSTRACT

An operation mechanism for a variable displacement hydraulic pump. The hydraulic pump is disposed in a housing filled with fluid. A capacity regulating member is provided on the hydraulic pump in the housing for changing the discharge amount of the hydraulic pump. An operation member is operationally connected to the capacity regulating member. The operation member is to be manipulated outside the housing. A resistive device is interposed between the operation member and the capacity regulating member for making the motion of the capacity regulating member slow. The resistive device is an assembly unit comprising a casing, a piston slidably disposed in the casing, and fluid filled in the casing. The casing is fitted into the hole provided in the housing.

4 Claims, 13 Drawing Sheets

OPERATION MECHANISM OF A VARIABLE DISPLACEMENT HYDRAULIC PUMP

CROSS-REFERENCE TO RELATED APPLICATION

This applications is a Continuation of U.S. patent application Ser. No. 10/392,305, filed on Mar. 20, 2003 now U.S. Pat. No. 6,968,686, which is a Continuation-in-Part of U.S. patent application Ser. No. 09/901,656 filed on Jul. 11, 2001, which issued as U.S. Pat. No. 6,536,212, the disclosures of which are incorporated in their entireties by reference hereto.

BACKGROUND OF THE INVENTION

1. Field of the Invention

The present invention relates to an operation mechanism of a variable displacement hydraulic pump in a hydrostatic transmission (hereinafter referred to as an "HST") adapted as a shift transmission for a vehicle, wherein the operation mechanism is attempted to reduce a shock in shifting the vehicle effectively, to have a good reliability in its motion and to ease assembly and maintenance.

2. Background Art

As well-known, there is a conventional HST comprising a hydraulic pump and a hydraulic motor fluidly connected with each other, wherein at least the hydraulic pump is volumetrically variable so that the capacity of the hydraulic pump is varied for changing the traveling speed of a vehicle. The hydraulic pump is provided with a capacity regulating member, e.g., a movable swash plate, operatively connected with a speed control device like a lever or a pedal on a vehicle. The capacity regulating member is operated in correspondence to the operational degree of the speed control device so as to changing the traveling speed of the vehicle.

Furthermore, conventionally, there are various well-known means to moderate the operation of the capacity regulating member for avoiding sudden shock in shifting as follows:

Japanese Utility Model Laid Open Gazette No. Hei 3-69,755 discloses a damper provided in an HST housing, wherein a rod of the damper is pivotally connected to a speed control arm for operating the capacity regulating member. Lubrication oil filled in the housing is introduced into the damper. In the damper, the flow of lubrication oil is limited by an orifice or the like. Thus, the damper serves as a fluid-resistive device which uses lubrication oil.

Japanese Utility Model No. Hei 7-16,138 discloses a gas damper replacing the above-mentioned damper, wherein the gas damper using air or the like is disposed in the HST housing, however, out of communication with lubrication oil in the housing.

Japanese Utility Model No. Hei 6-12,318 discloses a damper serving as a fluid-resistive device using HST-operation oil.

However, since the fluid-resistance generated by the damper which uses lubrication oil or HST-operation oil in an HST housing is small, the moderation of the capacity regulating member in motion may be insufficient.

The gas damper is also desired to be improved because of its small resistance and its large elasticity which causes uncertainty in its damping effect.

Furthermore, the above-mentioned conventional dampers cannot be assembled easily, thereby increasing the number of processes and labour for producing the HST.

BRIEF SUMMARY OF THE INVENTION

An object of the present invention is to provide an operation mechanism which operates a capacity regulating member of a variable displacement hydraulic pump disposed in a housing, wherein the capacity regulating member receives sufficient resistance so as to be moderated in its motion, and the capacity regulating member and the operation mechanism are finely assembled together.

To achieve the object, according to the present invention, the operation mechanism comprises an operating device and a resistive device. The operating device is operationally connected with the capacity regulating member. The operating device receives an operational force from the outside of the housing so as to operate the capacity regulating member. The resistive device is operationally connected with the capacity regulating member so as to give a resistant force onto the capacity regulating member in motion. The housing is filled with fluid so as to serve as a fluid sump.

The resistive device comprises a casing, a piston slidably disposed in the casing, and fluid filled in the casing. These component elements are previously assembled or composed together so as to serve as the unified resistive device. The housing is provided therein with a hole, in which the casing of the resistive device is immovably caught with a retainer disposed in the hole. The resistive device as an assembly unit is entirely removable, thereby facilitating its maintenance.

The hole is formed by a center section disposed in the housing. Therefore, the space for arranging the center section is also utilized to arrange the resistive device, thereby contributing for minimization of the device.

Fluid is allowed to flow between the casing and the fluid sump. Accordingly, it is unnecessary to fill the fluid hermetically in the fluid-resistive device before assembly thereof, thereby facilitating assembly of the device. When the fluid deteriorates, exchange of the fluid is facilitated. It may be alternatively constructed so that fluid in the casing is isolated from the fluid sump of the housing.

Outside the housing, the operation member is provided with a spring for returning the capacity regulating member to its neutral position. A pin for holding the spring when the spring is in its neutral position is inserted into the housing and interlocked with the piston. Accordingly, the number of parts can be reduced.

These, other and further objects, features and advantages of the invention will appear more fully from the following description taken in connection with the accompanying drawings.

BRIEF DESCRIPTION OF THE DRAWINGS/FIGURES

DETAILED DESCRIPTION OF THE INVENTION

Figure 1:
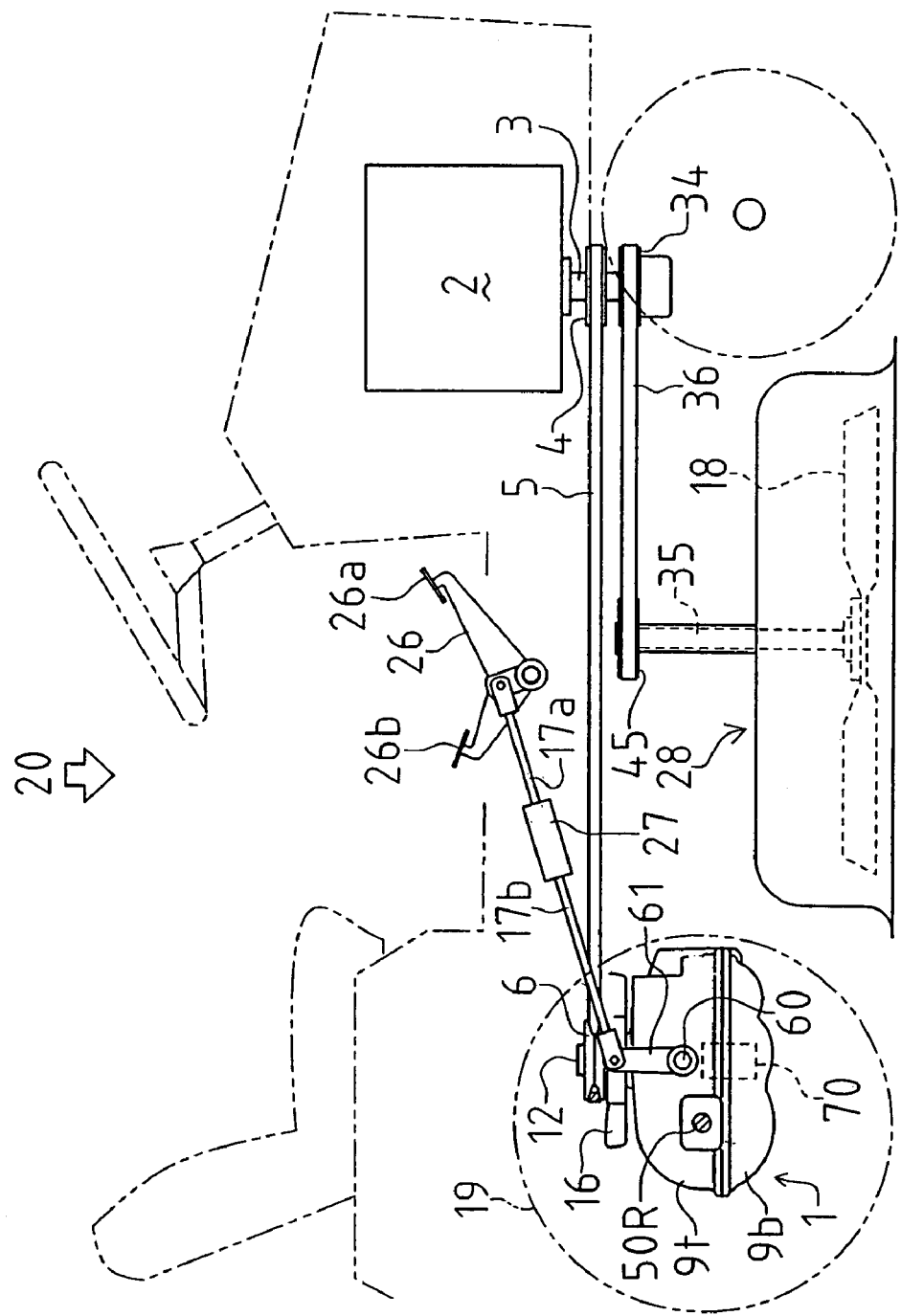
FIG. 1 is a side view of a mower tractor having an operation mechanism of a variable displacement hydraulic pump according to the present invention.

Description will be given on an entire structure of a mower tractor 20 employing an operation mechanism of the present invention in accordance with FIG. 1. Mower tractor 20 is of a mid-mount mower type which is provided at its mid-bottom portion with a mower 28. An engine 2 is supported on a front portion of the vehicle. An output shaft 3 of engine 2 is extended vertically downward and provided thereon with a pair of output pulleys 4 and 34.

An axle driving apparatus 1 is disposed at a rear portion of mower tractor 20. Axle driving apparatus 1 comprises a housing 9 as upper and lower housing parts 9*t* and 9*b* joined with each other, and a pair of left and right rear axles 50L and 50R supported by housing 9. Rear drive wheels 19 are fixed onto outer ends of respective rear axles 50L and 50R. Axle driving apparatus 1 comprises a vertical input shaft 12, which projects upwardly from upper housing part 9*t* of housing 9 and is fixedly provided thereon with an input pulley 6. A belt 5 is interposed between output pulley 4 and input pulley 6 so as to drivingly connect input shaft 12 to output pulley 3 of engine 2.

As mentioned above, mower 28 having rotary blades 18 is disposed at the mid-bottom portion of mower tractor 20. Mower 28 is provided with a drive shaft 35. An input pulley 45 is fixed onto a top end of drive shaft 35. A belt 36 is interposed between output pulley 34 and input pulley 45. Output pulley 34 is provided with an electromagnetic clutch, which is engaged to transfer power rotary blades 18 in mower 28 and disengaged to shut down the power from rotary blades 18.

A speed change pedal unit 26 as a speed control operation device is disposed on a footboard (not shown) of mower tractor 20. Speed change pedal unit 26 has a pair of front and rear speed change pedals 26*a* and 26*b* to be depressed. When front speed change pedal 26*a* is depressed, mower tractor 20 travels forward. When rear speed change pedal 26*b* is depressed, mower tractor 20 travels backward. Furthermore, the forward and backward traveling speed of mower tractor 20 is increased in proportion to the degree of depressing respective pedals 26*a* and 26*b*. Speed change pedal unit 26 is connected to a later-discussed control lever 61 provided on a side surface of housing 9 of axle driving apparatus 1 through a linkage comprising a front connection rod 17*a*, a rear connection rod 17*b* and a spring joint 27 interposed between connection rods 17*a* and 17*b*.

An operation device for speed changing is not limited to speed change pedal unit 26 of this embodiment. For example, the operation device for speed changing may be a lever.

Figure 4:
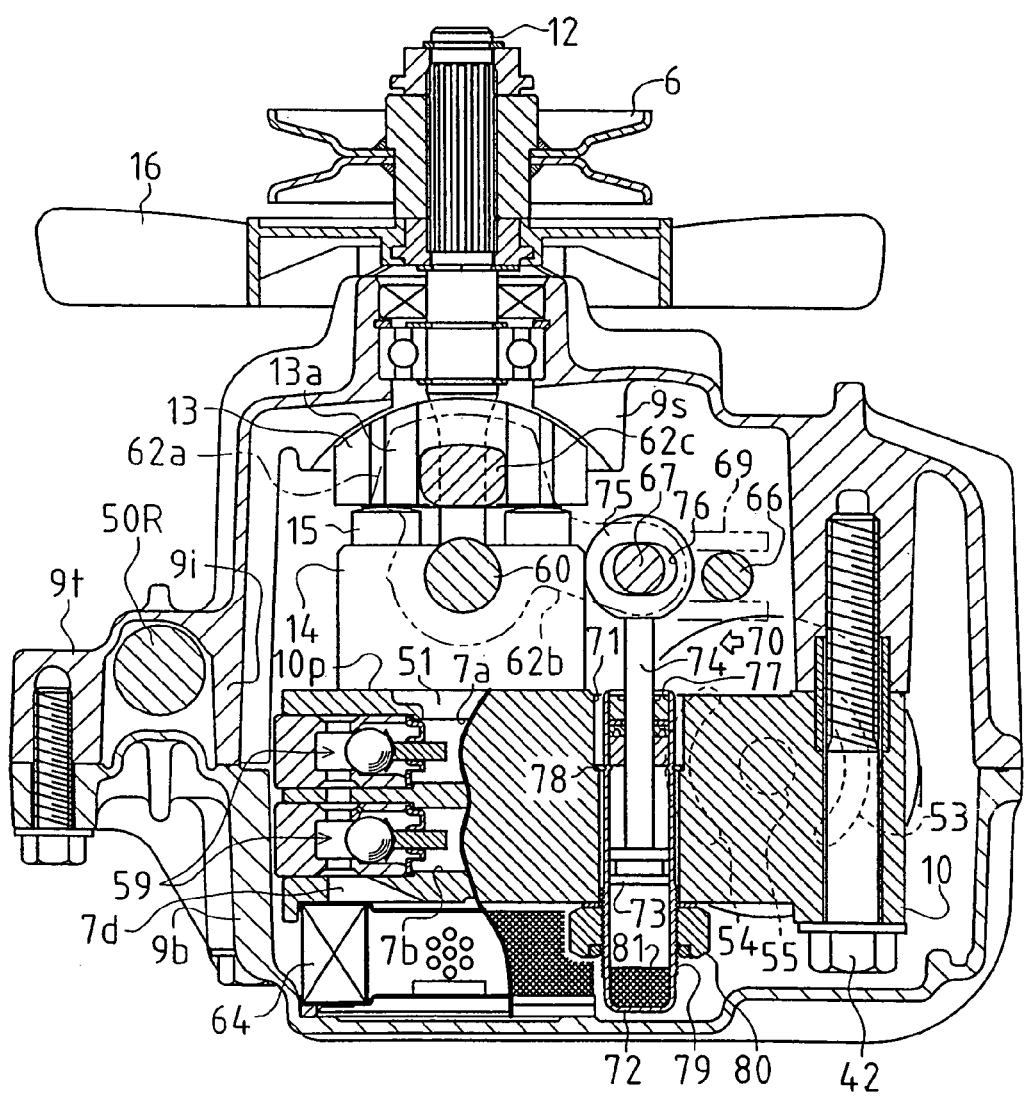
FIG. 4 is a cross sectional view taken on line A—A of FIG. 2 showing an internal damper according to a first embodiment of the present invention.

Description will now be given regarding axle driving apparatus 1. Housing 9 of axle driving apparatus I is formed by joining upper housing part 9*t* and lower housing part 9*b* with each other through their horizontal surrounding joint surfaces. As shown in FIG. 2 and 4, a bearing portion for a later-discussed motor shaft 22 is formed between the joint surfaces of upper and lower housing parts 9*t* and 9*b*. As shown in FIGS. 1, 2 and 4, bearings for journalling rear axles 50L and 50R are formed by upper housing part 9*t* above its joint surface. As shown in FIG. 2, both rear axles 50L and 50R are differentially connected at their distal ends with each other through a differential unit 40 in housing 9. Rear axles 50L and 50R project outwardly from left and right outer ends of housing 9 so as to be fixedly provided on their outer ends with rear wheels 19.

As shown in FIG. 2, housing 9 is integrally formed therein with an inner wall 9*i* which divides an internal space of housing 9 into a first chamber R1 and a second chamber R2. In first chamber R1 is disposed a hydrostatic transmission (hereinafter referred to as "HST") 8. In second chamber R2 are disposed a drive train 30, which serves as a gear train for transferring power from motor shaft 22 to differential unit 40, differential unit 40 and rear axles 50L and 50R.

As shown in FIG. 2, inner wall 9i comprises a lateral portion parallel to rear axles 50L and 50R and a longitudinal portion perpendicular to rear axles 50L and 50R arranged in series so that first chamber R1 and second chamber R2 are juxtaposed before and behind through the lateral portion of inner wall 9*i*, and juxtaposed left and right through the longitudinal portion of inner wall 9*i*. First and second chambers R1 and R2 are filled with common lubrication oil so as to form respective oil sumps.

More specifically, as shown in FIG. 2, within housing 9 is formed first chamber R1 in front of one axle 50R and laterally adjacent to drive train 30 interposed between motor shaft 22 and differential unit 40.

In first chamber R1 is disposed a center section 10 of HST 8 removably fastened to housing 9 with a bolt 42, as shown in FIG. 4. Center section 10 is elongated and arranged so that its longitudinal direction is oriented perpendicularly to rear axles 50L and 50R. Center section 10 is formed at its front half portion with a vertical surface serving as a motor mounting surface 10*m* onto which a hydraulic motor 21 is mounted. Center section 10 is formed at its rear half portion with a horizontal surface serving as a pump mounting surface 10*p* onto which a variable displacement hydraulic pump 11 is mounted. Above-mentioned input shaft 12 serving as a pump shaft is vertically inserted into center section 10 through a center of pump mounting surface 10*p* and rotatably supported.

Hydraulic pump 11 will be described in accordance with FIGS. 2 to 4. A cylinder block 14 is slidably rotatably mounted on pump mounting surface 10*p* through a valve plate. Cylinder block 14 is formed therein with a plurality of cylinder holes in parallel to its rotational axis. Pistons 15 are reciprocally inserted into the respective cylinder holes through biasing springs. Heads of pistons 15 abut against a movable swash plate 13 serving as a capacity regulating member for hydraulic pump 11.

Pump shaft 12 is not-relatively rotatably fitted through cylinder block 14, thereby serving as a rotational axis of cylinder block 14. The top end portion of pump shaft 12 projects upwardly from the top wall of upper housing part 9*t* and fixedly provided thereon with input pulley 6 and a cooling fan 16, as shown in FIGS. 1 and 3. As mentioned above, the rotational force of output shaft 3 of engine 2 is transferred into input pulley 6 through output pulley 4 and belt 5.

In this structure, by depressing either pedals 26a or 26b of speed change pedal unit 26, movable swash plate 13 is shifted slantwise at an optional degree from a position where its surface abutting against pistons 15 is perpendicular to the rotational axis of cylinder block 14, i.e., the surface is horizontal, thereby changing the amount and direction of oil discharged from hydraulic pump 11.

A closed hydraulic oil circuit formed in center section 10 will be described. As shown in FIGS. 3 and 4, center section 10 is bored therein with a pair of upper and lower oil passages 7a and 7b extended longitudinally in parallel with each other. A pair of kidney ports 51 and 52 are open at pump mounting surface 10p. A pair of kidney ports 53 and 54 are open at motor mounting surface 10m. Kidney ports 51 and 53 communicate with each other through upper oil passage 7a. Kidney port 52 is communicated to kidney port 54 through a slant oil passage 7c formed in center section 10 and lower oil passage 7b.

As shown in FIG. 4, a oil supplying passage 7d is vertically formed in center section 10 so as to cross oil passages 7a and 7b in the vicinity of ends of oil passages 7a and 7b. A pair of check valves 59 are disposed at the respective crossing points between oil supplying passage 7d and oil passage 7a, and between oil supplying passage 7d and oil passage 7b. Check valves 59 are opened only when oil is supplied into respective oil passages 7a and 7b. Oil supplying passage 7d is downwardly open at the bottom surface of center section 10. A cylindrical oil filter 63 is disposed below center section 10 so as to cover the downward opening of oil supplying passage 7d.

In this structure, hydraulic oil in housing 9 is introduced into oil supplying passage 7d through oil filter 63 and absorbed into either oil passage 7a or 7b in depression through corresponding one of upper and lower check valves 59, thereby compensating for the reduction of hydraulic pressure of HST 8 caused by the internal oil leak of HST 8.

As shown in FIG. 4, movable swash plate 13 is of a trunnion type. A back surface of movable swash plate 13 is formed into a convex arcuate slide surface, which is slidably fitted on a recessed arcuate supporting surface 9s formed at a ceiling wall of upper housing part 9t, thereby making swash plate 13 slidable along supporting surface 9s of housing 9.

Figure 2:
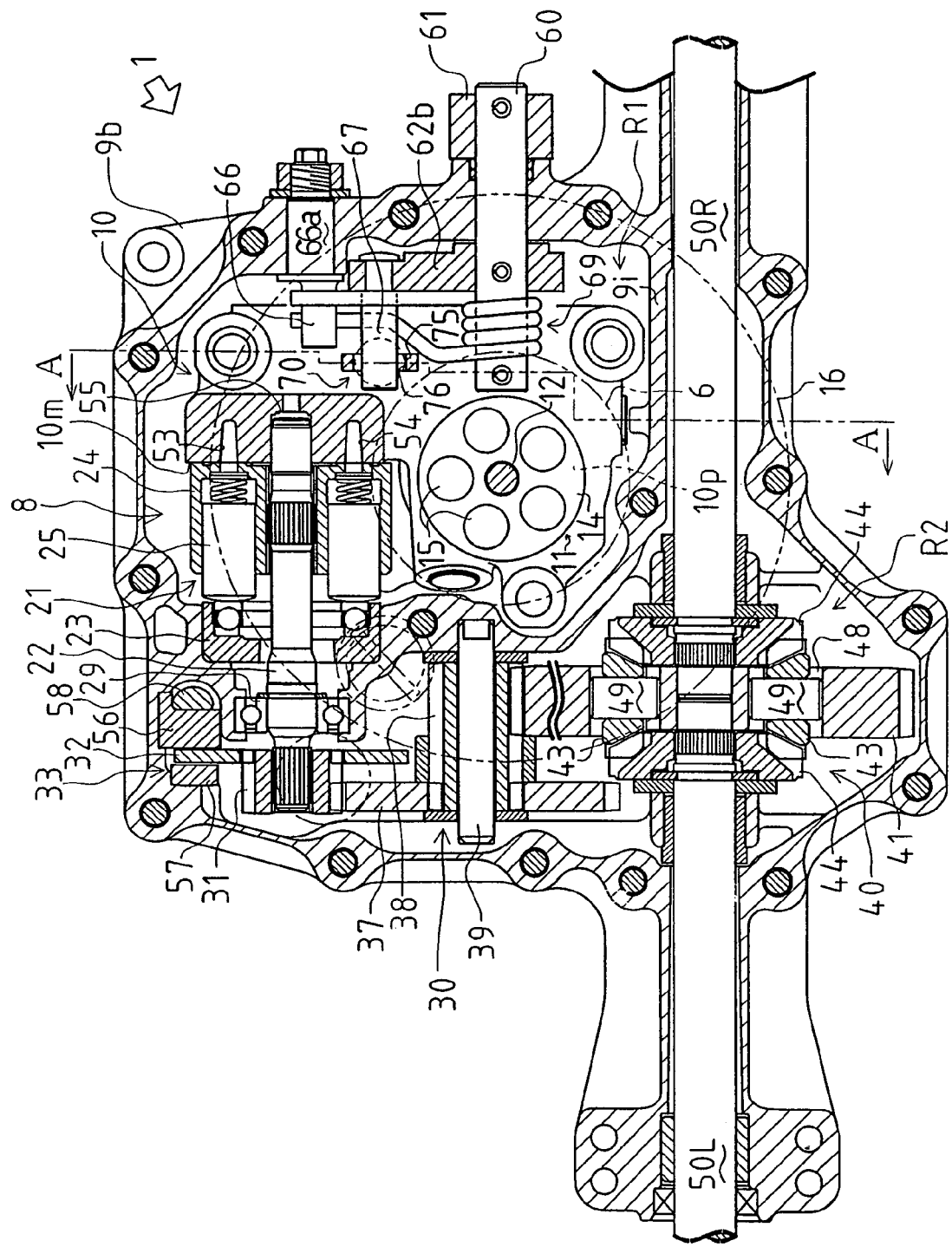
FIG. 2 is a sectional plan view of an axle driving apparatus provided on the mower tractor of FIG. 1.
Figure 5:
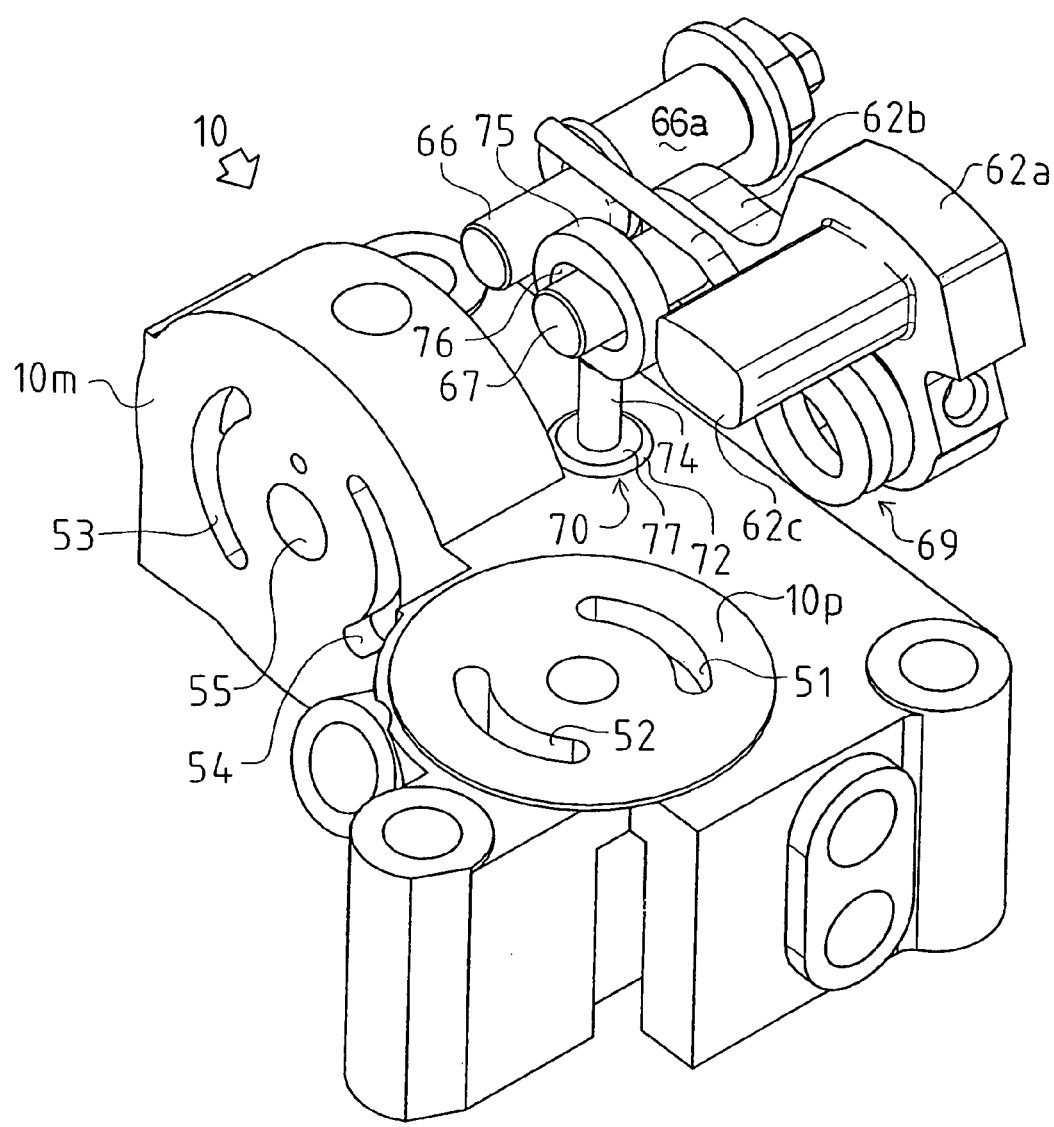
FIG. 5 is a perspective view of a center section 10 showing the inner damper and a connection arm of the first embodiment of the present invention.

As shown in FIGS. 1, 2 and 4, a speed control shaft 60 is journalled by a side wall of upper housing part 9t. As shown in FIGS. 2, 3 and 5, a connection arm member 62 is provided on an end portion of speed control shaft 60 in housing 9. Connection arm member 62 comprises a boss portion fixed around speed control shaft 60, a first arm 62a extended upwardly from the boss portion, and a second arm 62b extended forwardly from the boss portion.

Figure 3:
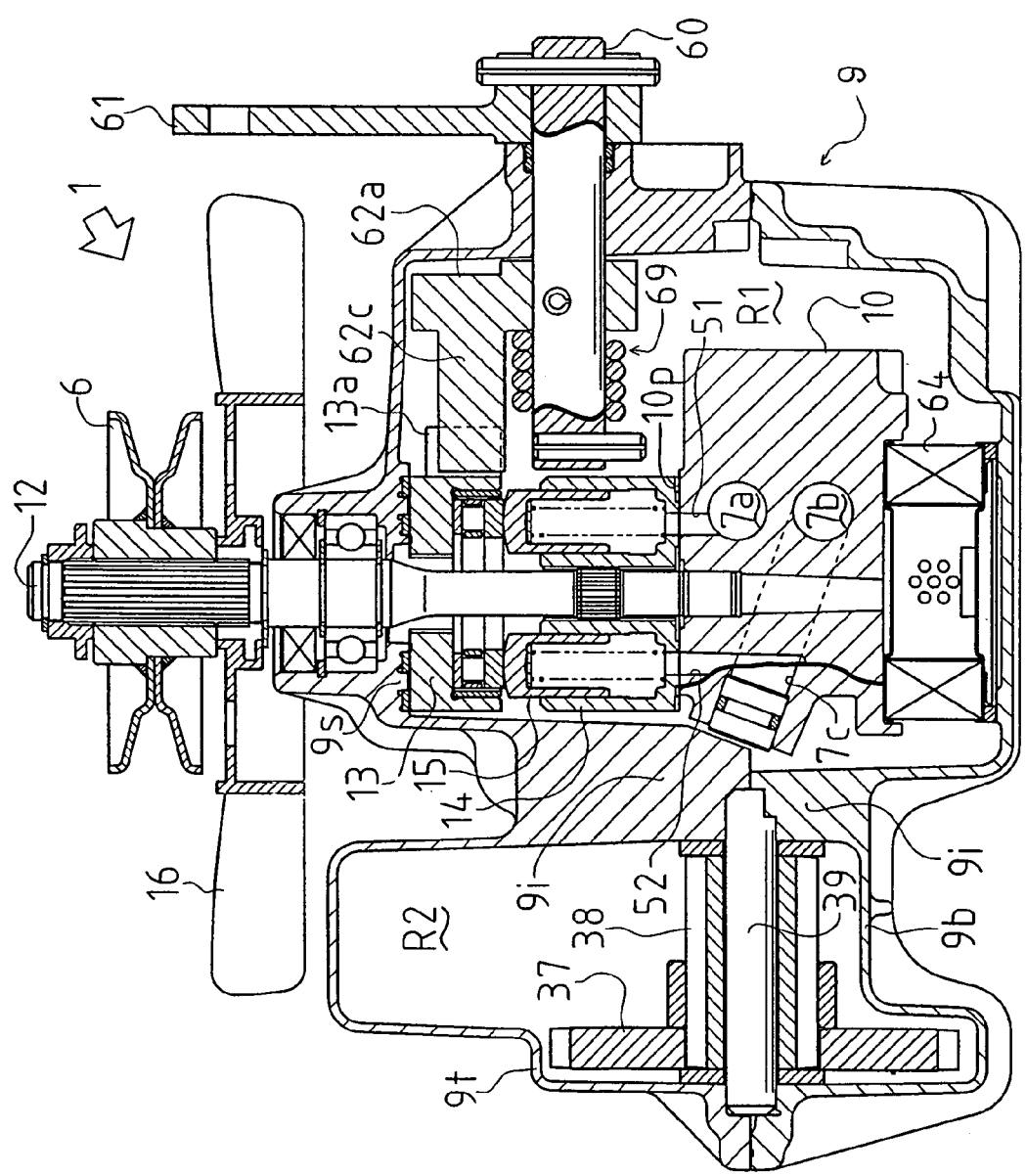
FIG. 3 is a sectional rear view of the axle driving apparatus of FIG. 2.

As shown in FIG. 3, an engaging segment 62c is extended from an utmost end of first arm 62a in parallel to speed control shaft 60. An utmost end of engaging segment 62c is engagingly inserted into an engaging portion 13a of movable swash plate 13. On the other hand, a speed control lever 61 is fixed onto speed control shaft 60 outside housing 9. As shown in FIG. 1, speed control lever 61 is connected through the above-mentioned linkage to speed change pedal unit 26 disposed before an operator's seat on the vehicle.

Due to this structure, by depressing either pedal 26a or 26b of speed change pedal unit 26, speed control lever 61 is rotated in the longitudinal direction of the vehicle so as to rotate movable swash plate 13 around the axis of speed control shaft 60, thereby changing the capacity of hydraulic pump 11 as mentioned above.

An engaging pin 67 projects from an utmost end portion of second arm 62b. In housing 9, a twisted coil spring serving as a neutral returning spring 69 is wound around speed control shaft 60. Both end portions of neutral returning spring 69 are twisted so as to cross each other and extended toward second arm 62b. An eccentric shaft 66 projects inwardly from a side wall of upper housing part 9t. Engaging pin 67 and eccentric shaft 66 are sandwiched between the extended end portions of neutral returning spring 69.

Engaging pin 67 is connected to a later-discussed internal damper device 70 so as to apply a resistance force onto movable swash plate 13 against a sudden operational force, thereby moderating the motion of movable swash plate 13.

In the above mentioned structure, by depressing either pedal 26a or 26b of speed change pedal unit 26, speed control lever 61 is rotated. At this time, one end portion of neutral returning spring 69 is pushed by engaging pin 67 away from the other end portion which is retained by eccentric shaft 66, thereby applying a biasing force onto speed control lever 61 for returning to its neutral position. Therefore, when speed control lever 61 is released from the operational force, neutral returning spring 69 returns so as to return engaging pin 67 to its neutral position which is defined by eccentric shaft 66.

Eccentric shaft 66 is integrally provided with a center shaft portion 66a journalled by the side wall of housing 9. Center shaft portion 66a is formed into an adjusting screw, projects outwardly from housing 9 and is provided therearound with a nut. Center shaft portion 66a is rotated and fastened to housing 9 with the nut so that eccentric shaft 66 is revolved around center shaft portion 66a, thereby adjusting the neutral position of movable swash plate 13.

Hydraulic motor 21 will now be described. A cylinder block 24 is arranged so as to orient its rotational axis laterally in parallel to axles 50L and 50R and slidably rotatably mounted onto vertical motor mounting surface 10m of center section 10 through a valve plate. Cylinder block 24 is bored with a plurality of cylinder holes in parallel to its rotational axis. A plurality of pistons 25 are reciprocally inserted into the respective cylinder holes through respective biasing springs.

A fixed swash plate 23 is fixedly sandwiched between upper and lower housing parts 9t and 9b. Heads of pistons 25 abut against fixed swash plate 23. Motor shaft 22 is disposed laterally in parallel to rear axles 50L and 50R and not-relatively fitted through cylinder block 24 on the rotational axis thereof.

One end of motor shaft 22 is rotatably inserted into a bearing hole 55 which is formed in center section 10 and open at the center of motor mounting surface 10m. A bearing 29 is sandwiched between upper and lower housing parts 9t and 9b in inner wall 9i. Motor shaft 22 is extended through swash plate 23, journalled by bearing 29, and projects at the other end thereof into second chamber R2. Bearing 29 is provided with a seal for preventing oil from flowing between chambers R1 and R2 through bearing 29.

Drive train 30 for transferring power from motor shaft 22 to differential unit 40 will be described. As shown in FIG. 2, in second chamber R2, an output gear 31 is fixed on motor shaft 22. A reduction shaft 39 is rotatably disposed in parallel behind motor shaft 22. Reduction shaft 39 is notched on its outer periphery so as to form a wide diametrically small gear 38. A diametrically large gear 37 is provided on its inner periphery with gear-teeth corresponding to teeth of diametrically small gear 38 so that diametrically large gear 37 is not-relatively rotatably but slidably provided around diametrically small gear 38. Diametrically large gear 37 engages with output gear 31 on motor shaft 22. Diametrically small gear 41 engages with an input gear 41 of differential unit 40.

As shown in FIG. 2, a brake disk 32 is not-relatively rotatably but slidably provided around output gear 31. Brake disk 32 is disposed between braking members 56 and 57, thereby constituting a brake device 33 which brakes motor shaft 22. A vertical brake shaft 58 is rotatably disposed adjacent to braking member 56. Brake shaft 58 is notched at its vertically intermediate portion so as to form a cam portion which is D-shaped in a sectional plan view. The cam portion of brake shaft 58 is disposed adjacent to a back surface of braking member 56. Brake shaft 58 projects upwardly from housing 9 so as to be linked with a brake pedal (not shown). By depressing the brake pedal, brake shaft 58 is rotated so that braking member 56 is pushed by the cam portion of brake shaft 58 and brake disk 32 is sandwiched and pressed between braking members 56 and 57, thereby applying a frictional braking force onto motor shaft 22.

Differential unit 40 will now be described in accordance with FIG. 2. Differential side gears 44 which are bevel gears are not-relatively rotatably provided on the distal end portions of respective coaxial rear axles 50L and 50R. Rear axles 50L and 50R are further extended from respective differential side gears 44 toward each other. Both the distal ends of rear axles 50L and 50R are slidably rotatably inserted into a central axial hole of input gear 41. Input gear 41 engages with diametrically small gear 38 on reduction shaft 39 so as to receive the output power of HST 8 through drive train 30. As shown in FIG. 2, input gear 41 is formed with a pair of through holes 48 into which bevel pinions 43 and pinion shafts 49 are disposed respectively.

Through holes 48 are disposed in input shaft 41 so as to have 180° of difference in phase from each other. Pinion shafts 49 are disposed in respective through holes 48 and rotatably provided thereon with respective bevel pinions 43. Each of bevel pinions 43 engages with both differential side gears 44.

Due to this structure, the rotational force of motor shaft 22 as the output power of HST 8 is reduced in its speed through drive train 30 and distributed in its torque between left and right rear axles 50L and 50R through differential unit 40.

Description will be given on an internal damper device 70 for moderating movable swash plate 13 while being suddenly operated. FIG. 4 shows a first embodiment of internal damper device 70. A vertical hole 71 is formed through a side portion of center section 10. In hole 71 is fixedly disposed an upwardly open cylindrical casing 72 which is closed at its bottom end. A piston 73 is vertically slidably inserted casing 72. A piston rod 74 is fixed on a top surface of piston 73 and projects upwardly through the top opening of casing 72. A connection tab 75 is formed on the top end of piston rod 74. Connection tab 75 is provided with a slot 76 through which engaging pin 67 is disposed. Slot 76 is considerably elongated in perpendicular to piston rod 74 so as to secure a play for engaging pin 67.

Fluid is filled in casing 72 and sealed by a ring-shaped lid 77 plugging the top opening of casing 72. Piston rod 74 slidably penetrates lid 77. Lid 77 is provided therein with a packing which abuts against the outer peripheral surface of piston rod 74 so as to seal fluid while the sliding of piston rod 74.

Piston 73 is provided on its peripheral surface with a seal ring. An orifice is formed between the outer peripheral surface of the seal ring and the inner peripheral surface of casing 72 so as to allow the fluid to flow between the chambers of casing 72 above and below piston 73 while limiting the quantity thereof.

Due to the above-mentioned structure, by rotating connection arm 62 for operating movable swash plate 13, piston rod 74 connected with engaging pin 67 through connection tab 75 is pushed and pulled so as to displace piston 73 vertically. The fluid sealed in casing 72 as mentioned above flows through piston 73 while being limited in quantity, thereby generating a fluid-resistance against piston 73. Thus, the rotational motion of movable swash plate 13 becomes slow so as to prevent an operator from shocks in sudden shifting or braking of the vehicle.

The fluid is different (in quality) from the hydraulic oil for HST 8 filled in housing 9. Various kinds of fluid may be available to this fluid. In this embodiment, gear oil or turbine oil is sealed in casing 72, and diesel engine oil is filled outside casing 72 in housing 9.

If this fluid in casing 72 is more viscous than the hydraulic oil for HST 8, internal damper device 70 may be minimized and the orifice through piston 73 may be wider so as to prevent the blocking of dust therein while its effect of slowing movable swash plate 13 is sufficiently secured. Also, such viscous fluid makes the motion of movable swash plate 13 sufficiently slow even if the stroke of movable swash plate 13 is small.

Alternatively, the fluid may be less viscous than the hydraulic oil for HST 8. Generally, such fluid having small viscosity is temperature-resistant, thereby securing a constant operation of slowing movable swash plate 13 regardless of variation of surrounding temperature (particularly, regardless of the increase of temperature caused by driving of HST 8).

In vertical hole 71, casing 72 is provided on its outer periphery with a ring-shaped groove in which a retaining ring 78 is engaged. Vertical hole 71 is stepped so that its diameter above the step is larger than that below the step. Retaining ring 78 is put on a horizontal surface of the step of hole 71 and the outer periphery of retaining ring 78 abuts against the inner periphery of the upper portion of vertical hole 71, thereby fixing casing 72 along its proper vertical axis. On the other hand, below vertical hole 71 (or center section 10), casing 72 is formed into a screw portion 79. A nut 80 is screwed around screw portion 79 so as to fasten casing 72 to center section 10, thereby fixing casing 72 in the vertical direction. If casing 72 is to be removed from center section 10 for its maintenance or the like, nut 80 is removed from screw portion 79.

Internal damper device 70 is a previously unified assembly as casing 72, which contains piston 73, the fluid and the like and is plugged by lid 77. This assembly is inserted into hole 71 and fixedly attached to center section 10, thereby completing the arrangement of internal damper device 70. This arrangement is easy and contributes for reducing processes in manufacturing axle driving apparatus 1. Also, internal damper device 70 is easily removed as a unit from center section 10, thereby facilitating its maintenance and adjustment. In the conventional construction of an internal damper device, piston 73 is directly inserted into hole 71. However, if the positioning or size of hole 71 with respect to piston 73 is mismatched, or if the surface of hole 71 is inaccurately processed, operation of internal damper device 70 is not stabilized, and there is a possibility that piston rod 74 may be damaged. Thus, high accuracy is required to process hole 71 in a center section for directly incorporating piston 73, thereby reducing productivity. However, according to this embodiment of the present invention, although some accuracy error may arise in the positioning, sizing or surface processing of hole 71, the best casing 72 fitting piston 73 for stabilizing operation of internal damper device 70 may be selected from among various casings 72 or produced easily and inexpensively, thereby improving productivity.

A sponge 81 is disposed in the bottom portion of casing 72. The upper and lower chambers through piston 73 in casing 72 are volumetrically different from each other because piston rod 74 extends from one side of piston 73. Sponge 80 is disposed oppositely to piston rod 74 with respect to piston 73, thereby equalizing the volumes of both chambers in casing 72.

Figure 6:
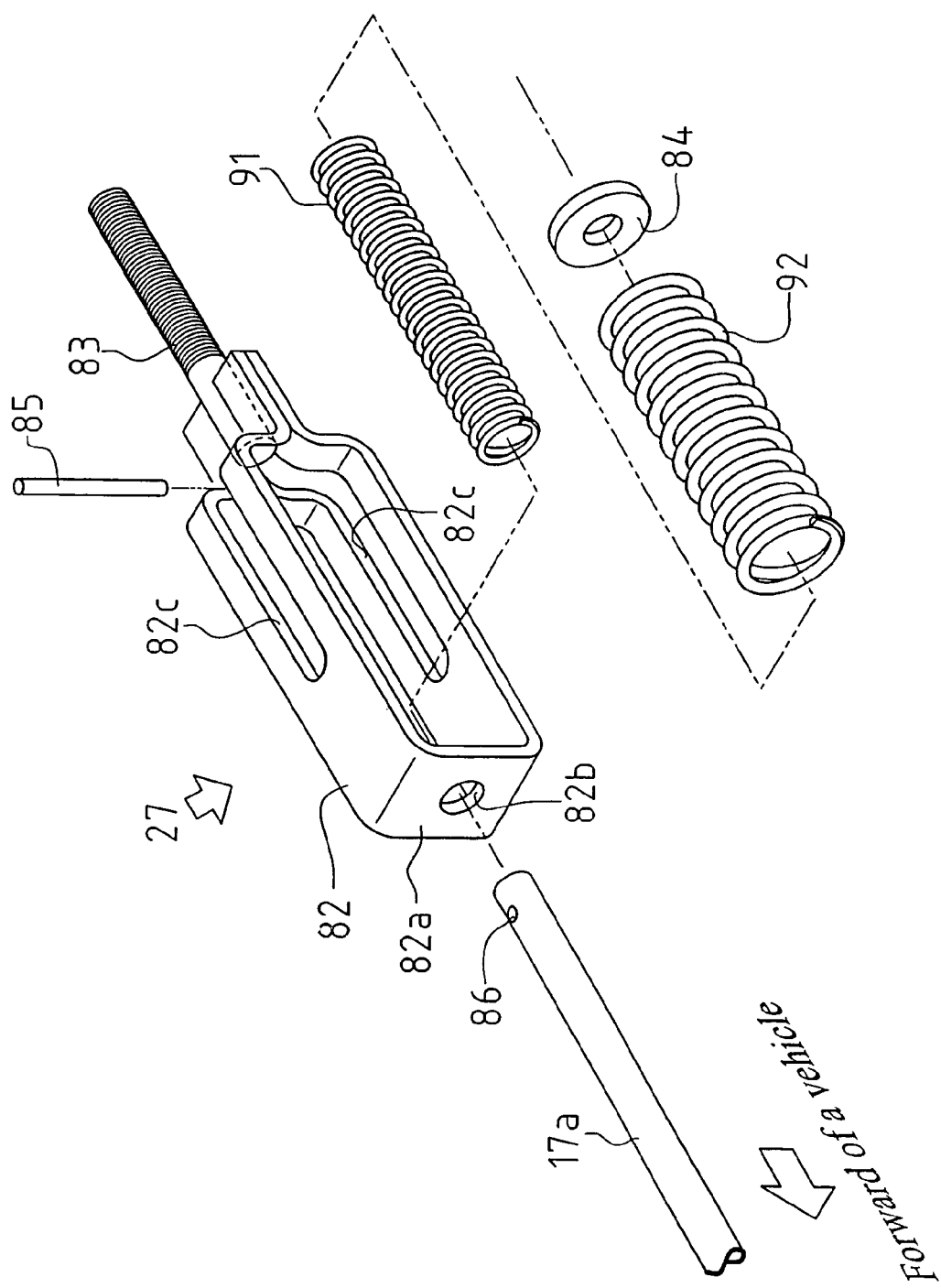
FIG. 6 is an exploded perspective view of a spring joint of the present invention during assembly.

Description will be given on spring joint 27 provided in the linkage interposed between speed control lever 61 and speed change pedal unit 26. As shown in FIG. 6, spring joint 27 comprises a hollow frame 82 and thread rod 83. Hollow frame 82 is formed by bending an elongated rectangular plate. Thread rod 83 is sandwiched by a rear end portion of hollow frame 82 and fixed to hollow frame 82 by welding. Rear connection rod 17b is screwed together with thread rod 83 so that rear connection rod 17b is extended backward from thread rod 83 while being adjustable in its backward extension.

A turning portion 82a of hollow frame 82 as a front end portion thereof is bored by a hole 82b. Front connection rod 17a is inserted into hollow frame 82 through hole 82b. In hollow frame 82, front connection rod 17a is doubly provided therearound with a pair of coiled first and second springs 91 and 92 and axially slidably provided therearound with a spring-retaining collar 84. Front connection rod 17a is diametrically bored through by a hole 86 through which a stopper pin 85 penetrates front connection rod 17a. Stopper pin 85 restricts the backward sliding of spring-retaining collar 84 along front connection rod 17a toward thread rod 83. Hollow frame 82 is formed at its end portion toward thread rod 83 (at its rear end portion) with upper and lower slots 82c. Both end portions of stopper pin 85 projecting from front connection rod 17a are slidably inserted into upper and lower slots 82c.

Figure 7:
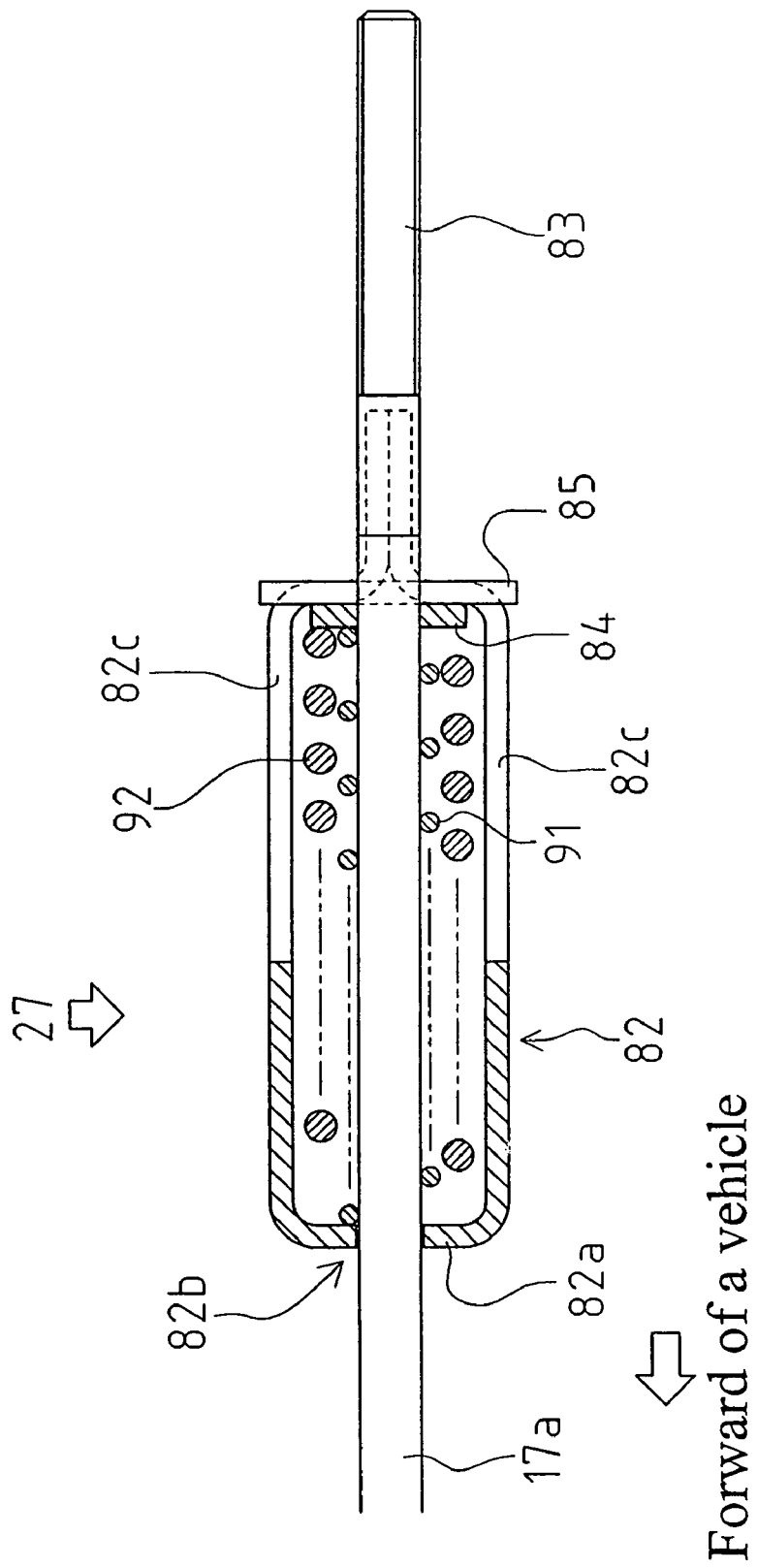
FIG. 7 is a sectional view of the spring joint of FIG. 6.

As shown in FIG. 7, first spring 91 which is diametrically smaller than second spring 92 abuts at its rear end against spring-retaining collar 84, and abuts at its front end against turning portion 82a of hollow frame 82. Due to this structure, when speed change pedal unit 26 is not operated, first spring 91 presses spring-retaining collar 84 against stopper pin 85 so that front connection rod 17a which is integral with spring-retaining collar 84 is pulled backward so as to abut at its rear end against a front end of thread rod 83. Thus, rear connection rod 17b is located so as to hold movable swash plate 13 in connection with rear connection rod 17b through speed control lever 61, speed control shaft 60 and connection arm 62 at its neutral position. At this time, hydraulic pump 11 does not discharge hydraulic oil, thereby keeping axles 50L and 50R at a standstill. Therefore, the vehicle is made stationary.

From this condition, if a front pedal 26a of speed change pedal unit 26 is depressed, front connection rod 17a in connection with front pedal 26a is pulled forward so as to move spring-retaining collar 84 forward. First spring 91 is compressed by spring-retaining collar 84 and pushes turning portion 82a of hollow frame 82 forward. Thus, rear connection rod 17b which is fixed to hollow frame 82 through thread rod 83 is pulled forward so as to rotate speed control lever 61 forward. Consequently, movable swash plate 13 is rotated from its neutral position so that hydraulic pump 11 discharges oil for driving rear axles 50L and 50R forwardly, thereby making the vehicle travel forward.

Even if front pedal 26a of speed change pedal unit 26 is depressed considerably suddenly, the reaction of speed control lever 61 to the depression of pedal 26a is delayed by spring joint 27, and also, movable swash plate 13 operationally follows speed control lever 61 through internal damper device 70. Therefore, the starting motion of movable swash plate 13 is moderated by synergy between the elastic action of spring joint 27 and the fluidic resistance of internal damper device 70 so that the vehicle can start smoothly. A vehicle without such moderation is likely to encounter a jarring raising of the front end of the vehicle, a phenomenon that is peculiar to rear-wheel driving vehicles.

The initial length of second spring 92 around first spring 91 is shorter than that of first spring 91, more specified, shorter than the distance between the front and rear ends of the hollow space of frame 82. Thus, when speed change pedal unit 26 is unpressed as shown in FIG. 7, neither spring-retaining collar 84 nor turning portion 82a of hollow frame 82 receives the spring force of second spring 92. However, when front pedal 26a of speed change pedal unit 26 is depressed beyond a certain stroke, spring-retaining collar 84 pulled forward approaches turning portion 82a of hollow frame 82 so that the distance between spring-retaining collar 84 and turning portion 82a becomes shorter than the initial length of second spring 92. Consequently, double forces of compressed first and second springs 91 and 92 is applied onto turning portion 82a.

Figure 8:
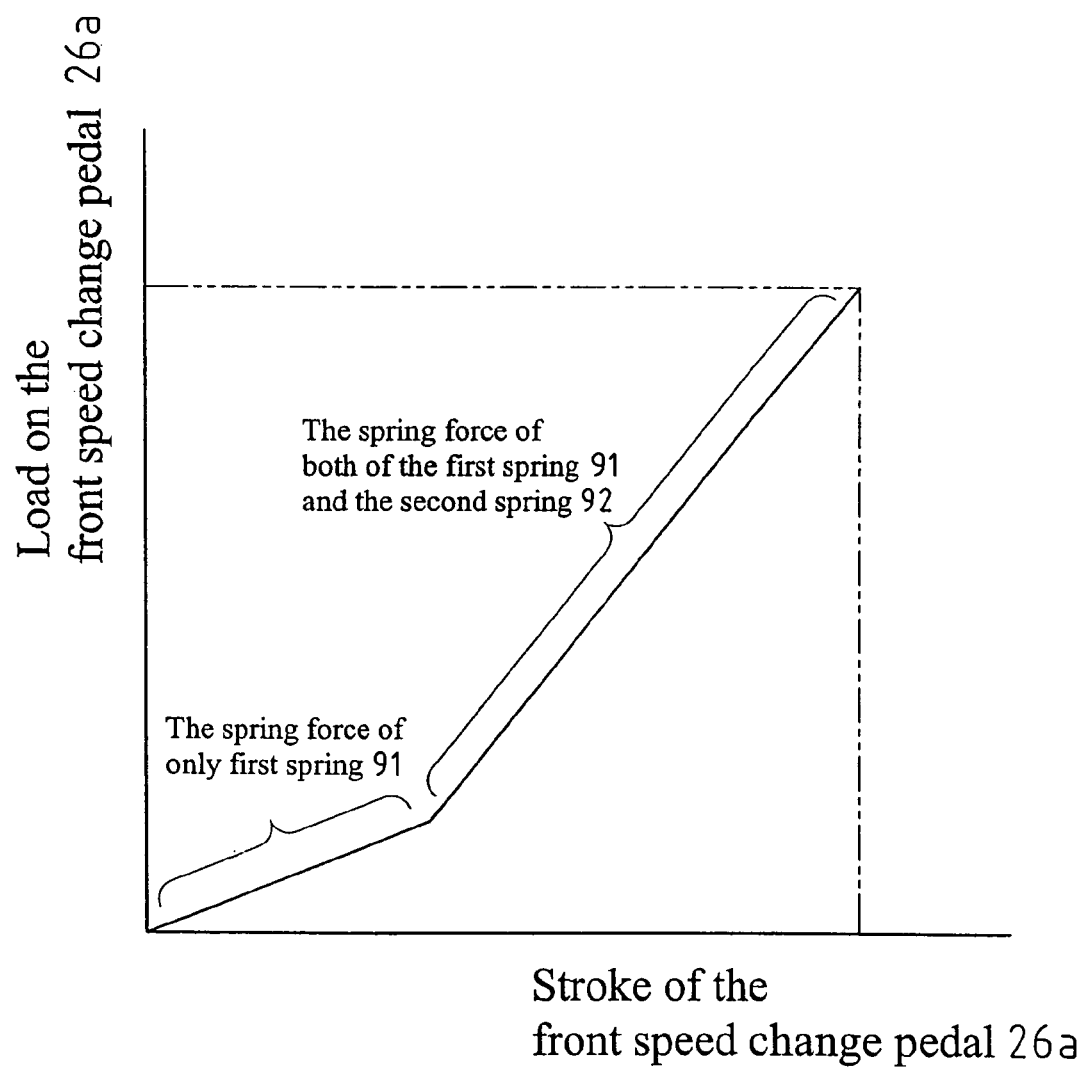
FIG. 8 is a graph of the load on a speed control pedal of the present invention relative to the stroke of the pedal.

As is clear from a graph of FIG. 8, which illustrates load on front pedal 26a caused by spring joint 27 in relative to a stroke of pedal 26a, until the stroke of depressed pedal 26a reaches a length S, only the force of first spring 91 acts so that the load applied on speed change pedal unit 26 by spring joint 27 is gently increased in proportion to the stroke of pedal 26a. When pedal 26a is depressed over a stroke of length S, both the spring forces of first and second springs 91 and 92 act so that the ascent in load on pedal 26a becomes steep.

Due to such a structure, at the beginning of depressing front pedal 26a from the stationary condition of the vehicle, the force of spring joint 27 in pulling speed control lever 61 is weak because it is generated by only first spring 91. Therefore, the resistive action of internal damper device 70 is relatively strongly performed, thereby forcing movable swash plate 13 to move slowly so as to restrict the shock in starting of the vehicle. When front pedal 26a is depressed over stroke S so as to accelerate the vehicle, both springs 91 and 92 in spring joint 27 strongly pull speed control lever 61 so that movable swash plate 13 reacts immediately in response to depression of front pedal 26a regardless of internal damper device 70, thereby accelerating the vehicle desirably.

Incidentally, when rear pedal 26b of speed change pedal unit 26 is depressed for driving the vehicle backward, front connection rod 17a is pushed backward while its rear end abutting against the front end of thread rod 83, thereby rigidly pushing speed control lever 61 through thread rod 83 and rear connection rod 17b so as to rotate it backward. Thus, the elastic action of springs 91 and 92 in spring joint 27 does not effect to the backward operation of the vehicle. Mower tractor 20 in connection with this embodiment is a rear-wheel driving vehicle, which has the problem solved by the invention that, if front pedal 26a is depressed suddenly, the vehicle suddenly starts forward while its head possibly rises. However, even if rear pedal 26b is depressed suddenly, rear wheels 19 merely run idle while slipping so that the vehicle rarely starts with a sudden backward motion. Thus, spring joint 27 is structured on the basis of such a notion that it is enough if only the sudden starting in forward operation of the vehicle is prevented by the elastic action thereof.

The structure of spring joint 27 is not limited to the above-mentioned double spring structure. For example, double springs 91 and 92 may be replaced with a single spring such as a conically coiled spring or other various nonlinear springs, whose force is acceleratedly increased by being compressed over a certain displacement.

In this embodiment, the combination of spring joint 27 and internal damper device 70 serves as a resistive device for forcing movable swash plate 13 to move slowly. Even if only internal damper device 70 is used, the effect of restricting movable swash plate 13 in motion is secured. However, such a resistive device as a combination of spring joint 27 and internal damper device 70 is more available because it is rationally effective in both prevention of shock in starting and respondency of acceleration to accelerating operation.

Figure 9:
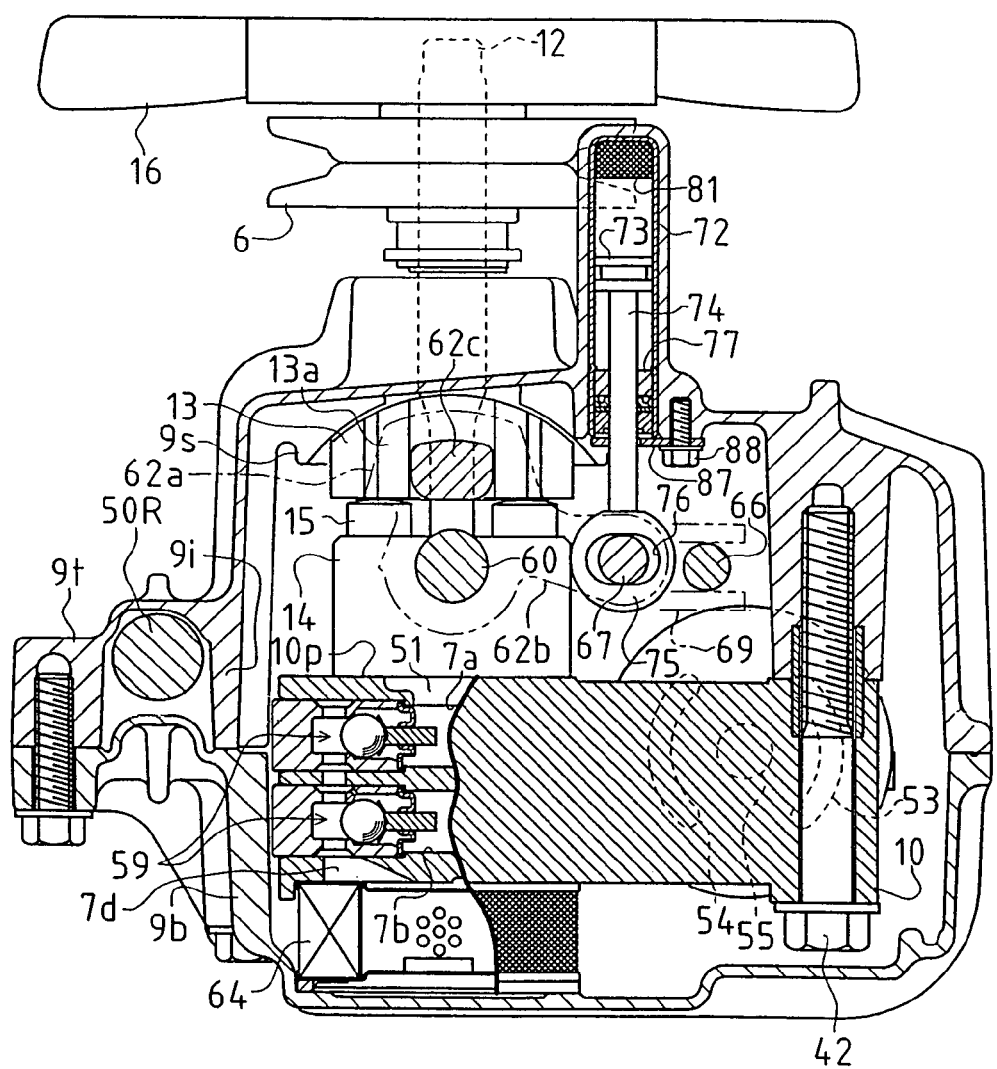
FIG. 9 is a cross sectional view taken on line A—A of FIG. 2 showing an internal damper according to a second embodiment of the present invention.

A second embodiment of internal damper device 70 will be described in accordance with FIG. 9. A part of the ceiling wall of upper housing part 9t projects upwardly so as to form therein with a recessed portion (hole) 9r which is downwardly open. Internal damper device 70 is fitted into recessed portion 9r. This internal damper device 70 is substantially similar with that of the first embodiment as shown in FIG. 4. The different points are that this internal damper device 70 is vertically reversed, that recessed portion 9r in which internal damper device 70 is disposed is not formed of center section 10 but formed of upper housing part 9t, that a screw like the above-mentioned screw 79 is not formed on the periphery of casing 72, and that a discoid retaining member 87 to which internal damper device 70 in recessed portion 9r is fixed replaces retaining ring 78 and nut 80.

Piston rod 74 is extended downwardly from piston 73 so as to project downwardly from casing 72 and retaining member 87. The bottom end of piston rod 74 is formed into connection tab 75 having slot 76. Engaging pin 67 is inserted through slot 75. The position of cooling fan 16 fixed onto input shaft 12 is located higher than that shown in FIG. 4, thereby being prevented from interfering with upward projecting recessed portion 9r of upper housing part 9t.

In the second embodiment, internal damper device 70 comprising casing 72, piston 73, piston rod 74, lid 77, fluid sealed in casing 72 and sponge 81 is also a previously assembled unit. At the site of assembling axle driving apparatus 1, internal damper device 70 as a unit is fitted into recessed portion 9r of upper housing part 9t and fixed thereto together with retaining member 87 through bolts 88. Internal damper device 70 can be removed from recessed portion 9r by screwing out bolts 88 and removing retaining member 87 from upper housing part 9t, thereby facilitating maintenance.

Figure 10:
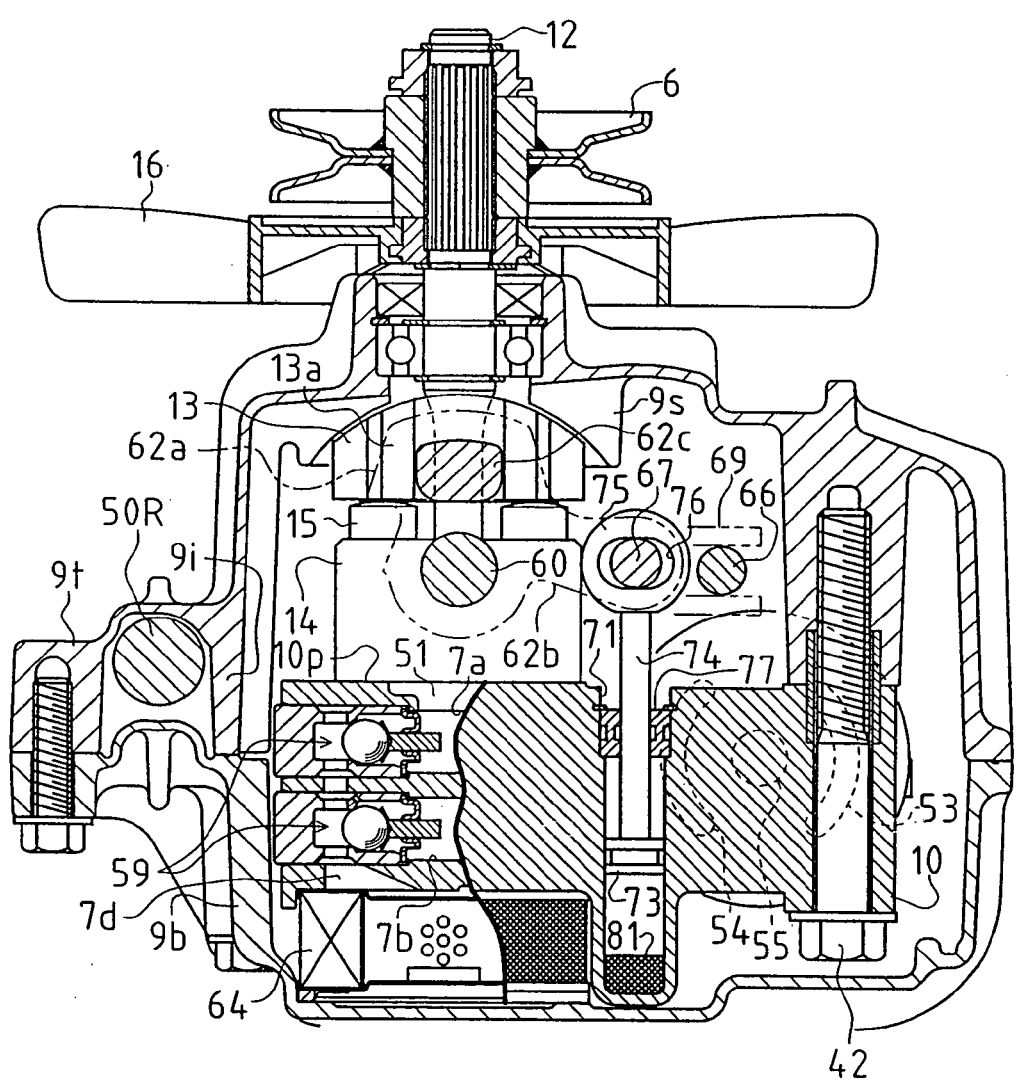
FIG. 10 is a cross sectional view taken on line A—A of FIG. 2 showing an internal damper according to a third embodiment of the present invention.

A third embodiment of internal damper device 70 will be described in accordance with FIG. 10. Similarly with the first embodiment, internal damper device 70 is structured in center section 10. However, a vertical hole 71 is further downwardly extended and closed below the bottom surface of center section 10, thereby being formed as a downwardly projecting recessed portion. Piston 73, the fluid, sponge 81 and the like are directly disposed in hole 71 without casing 72. The open top end of hole 71 is covered with a ring-shaped lid 77. Other parts and structure are similar with those of the first embodiment.

Figure 11:
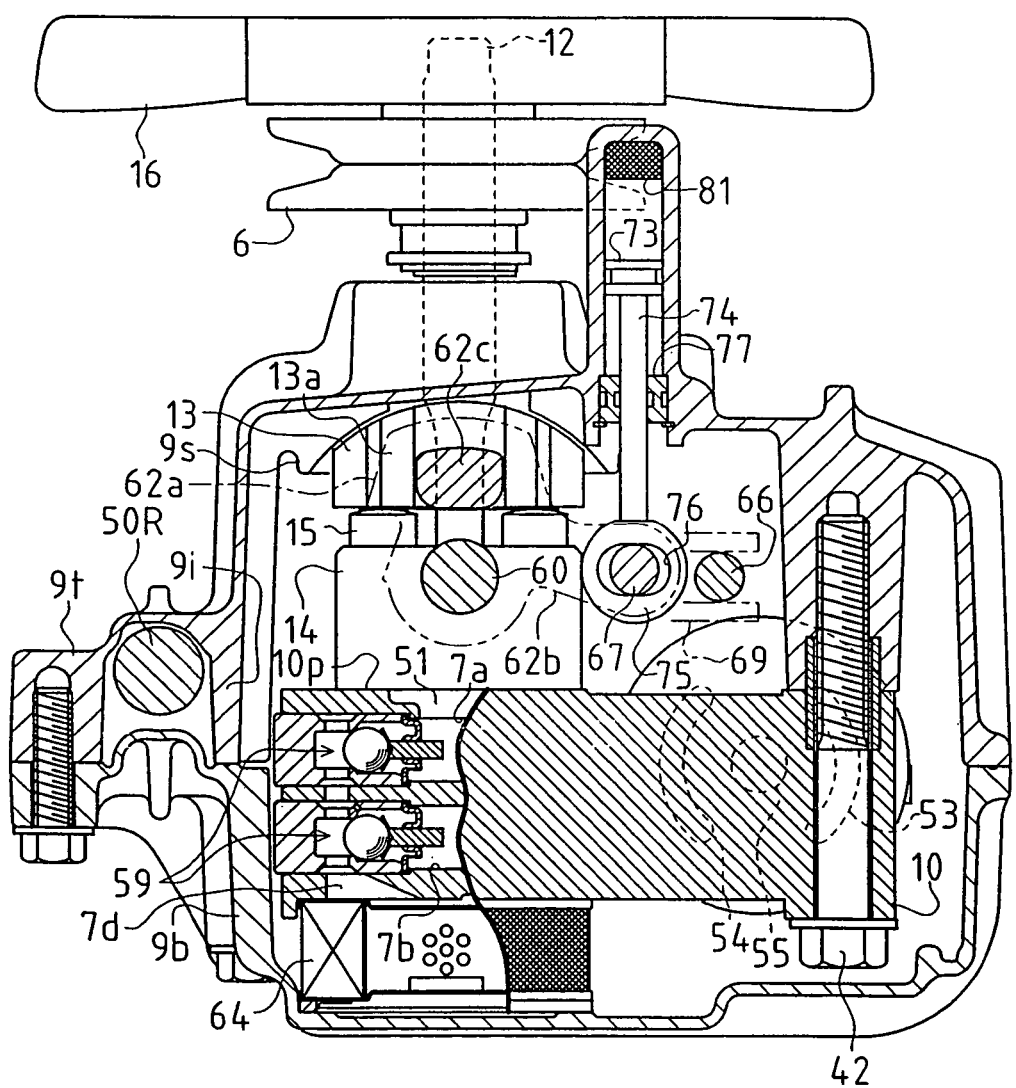
FIG. 11 is a cross sectional view taken on line A—A of FIG. 2 showing an internal damper according to a fourth embodiment of the present invention.

A fourth embodiment of internal damper device 70 will be described in accordance with FIG. 11. Similarly with the second embodiment, internal damper device 70 is structured in upper housing part 9t. However, piston 73, sponge 81 and lid 77 are directly disposed in recessed portion (hole) 9r formed of the ceiling wall of upper housing part 9t and the fluid is sealed therein without casing 72, engaging member 87 and so on. Other parts and structure are similar with those of the second embodiment.

Figure 12:
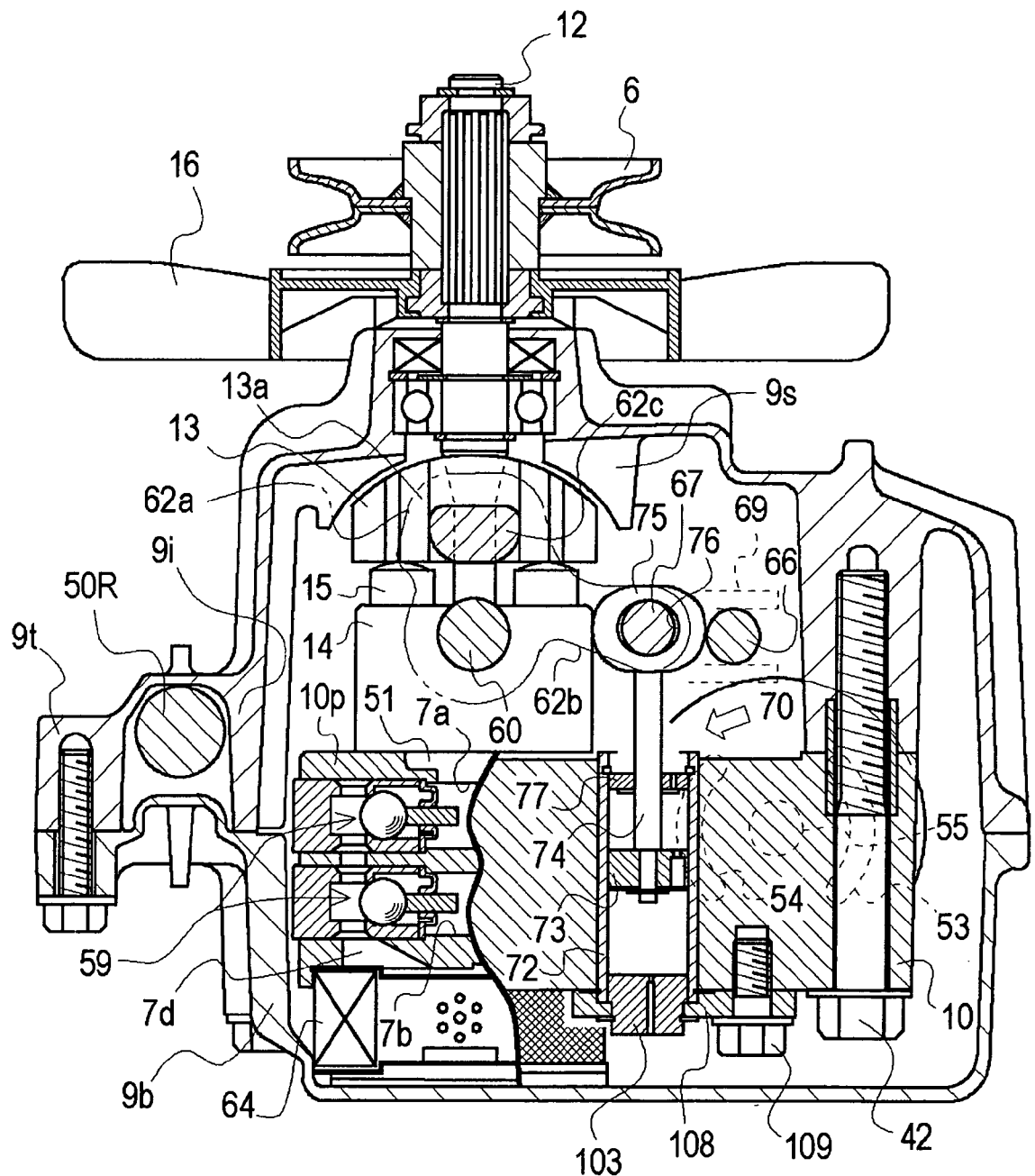
FIG. 12 is a cross sectional view taken on line A—A of FIG. 2 showing an internal damper according to a fifth embodiment of the present invention.
Figure 13:
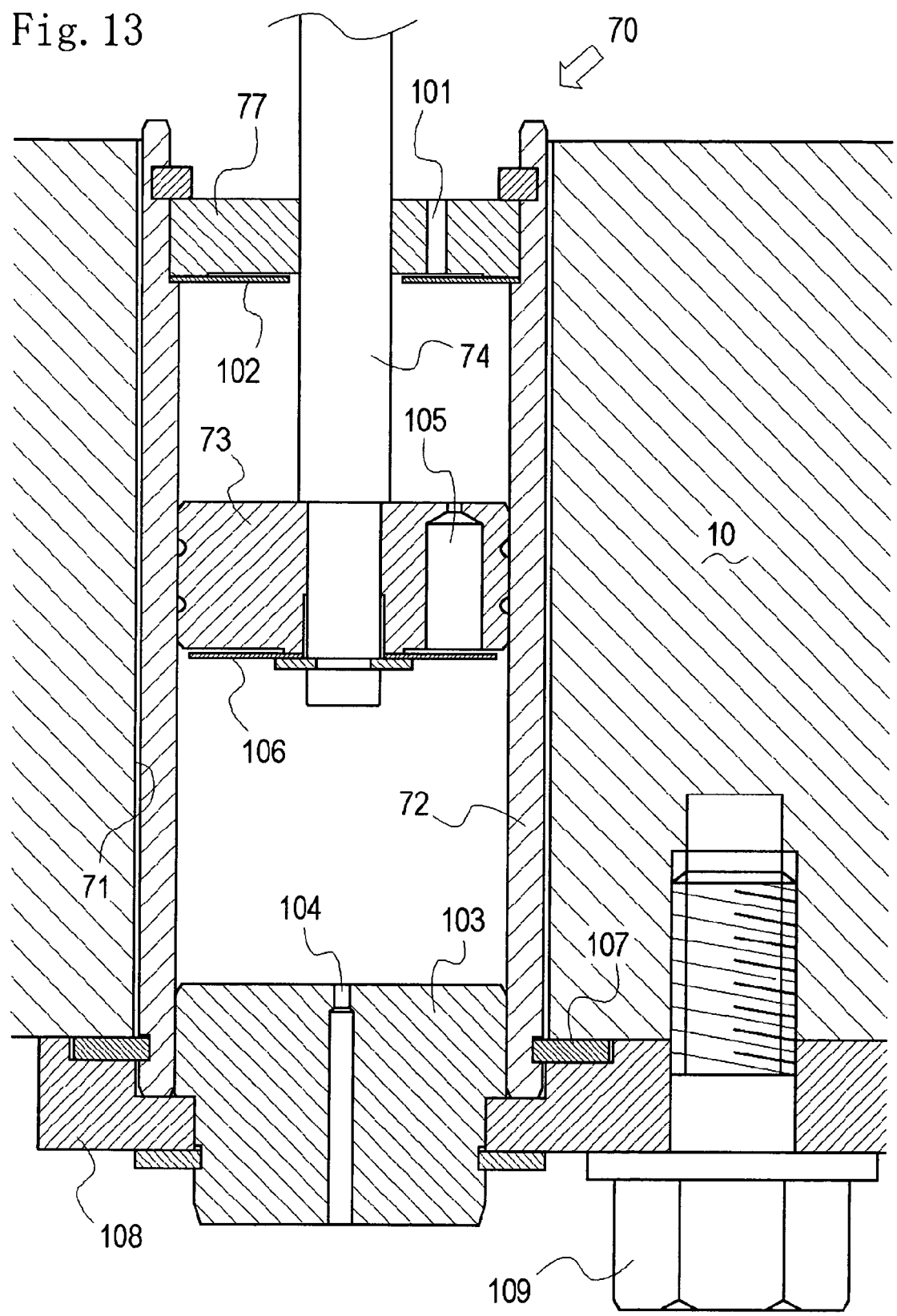
FIG. 13 is a sectional side view showing the circumference of a piston of the internal damper according to the fifth embodiment of the present invention.

A fifth embodiment of internal damper device 70 will be described in accordance with FIGS. 12 and 13. With regard to the fifth embodiment, internal damper device 70 is structured in center section 10 similarly with the first embodiment. However, casing 72 is unsealed, and lubrication oil in the HST housing is used as the fluid for applying a resistance to piston 73 in the casing 72.

A vertical hole 71 is formed through a portion of center section 10 connecting the pump mounting surface thereof to the motor mounting surfaces thereof. In hole 71 is fixedly disposed a cylindrical casing 72 which is open at its top and bottom ends. A piston 73 is vertically slidably inserted in casing 72. A piston rod 74 is fixed on a top surface of piston 73 and projects upwardly through the top opening of casing 72.

Casing 72 is sealed by a ring-shaped lid 77 plugging the top opening thereof. An orifice 101 communicating inside and outside of casing 72 is provided in lid 77. A later-discussed reed valve 102 is disposed so as to cover one of the ends of orifice 101 (in this embodiment, lower end thereof). Piston rod 74 slidably penetrates lid 77.

Casing 72 is sealed by a lid 103 plugging the bottom opening thereof. An orifice 104 communicating inside and outside of casing 72 is provided in lid 77. Piston 73 is bored through by an orifice 105. A later-discussed reed valve 106 is disposed so as to cover one of the ends of orifice 105 (in this embodiment, lower end thereof). Therefore, an upper chamber above piston 73 and a lower chamber below piston 73 are formed in casing 72. The upper and lower chambers are filled therein with oil from the lubrication oil sump in the housing through respective orifices 101 and 104.

Reed valves 102 and 106 are opened by pressure applied from above, and closed by pressure from below. Accordingly, when piston 73 is going to move upwardly to rotate swash plate 13 in one direction, piston 73 presses up lubrication oil in the upper chamber above piston 73 so as to close reed valve 102. However, the pressure of lubrication oil in the lower chamber below piston 73 becomes lower than that in the upper chamber above piston 73 so as to open reed valve 106, thereby allowing the pressured oil in the upper chamber above piston 73 to flow to the lower chamber below piston 73 in casing 72 through orifice 105. This flow of oil through orifice 105 allows piston 73 to move upward while the pressured oil above piston 73 resists piston 73.

On the other hand, when piston 73 is going to move downwardly to rotate swash plate 13 in the other direction, piston 73 pressures lubrication oil in the lower chamber below piston 73 so as to close reed valve 106. However, the pressured lubrication oil in the lower chamber below piston 73 is drained to the lubrication oil sump in the housing below lid 103 so as to allow piston 73 to move downward while the pressured oil below piston 73 resists piston 73. According to the downward movement of piston 73, the upper chamber above piston 73 is depressed so as to open reed valve 102, whereby lubrication oil flows into the upper chamber from the oil sump in the housing above lid 77 so as to compensate for loss of oil in casing 72.

Due to this construction, resistance is generated against movement of piston 73 by orifices 101, 104 and 105 without using fluid having different viscosity from that of lubrication oil.

Casing 72 is provided near the lower end of its outer periphery with a ring-shaped groove in which a retaining ring 107 is engaged. Retaining ring 107 is located so as to abut at an upper surface thereof against the lower surface of center section 10. A fixture member 108 is fastened to the lower surface of center section 10 by a bolt 109 so as to cover the lower surface of retaining ring 107. Accordingly, casing 72 is fixed to center section 10 by sandwiching retaining ring 107 between center section 10 and fixing portion 108.

In this embodiment, internal damper device 70 comprising casing 72, piston 73, piston rod 74, and lids 77 and 103 is also a previously assembled unit. When assembling axle driving apparatus 1, internal damper device 70 as a unit is fitted into hole 71 of center section 10 and fixed thereto together with retaining member 108 through bolts 109. Internal damper device 70 can be removed from hole 71 by screwing out bolts 109 and removing retaining member 108 from center section 10. Accordingly, the number of processes for producing axle driving apparatus 1 can be reduced, and maintainability of axle driving apparatus 1 can be improved.

Other parts and structure of fifth embodiment are similar with those of the first embodiment. With regard to this embodiment, piston 73 is disposed in casing 72. However, internal damper device 70 can be structured that casing 72 is not used, and lids 77 and 103 is fixed directly to hole 71.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents. All patents and publications discussed herein are incorporated in their entirety by reference thereto.

What is claimed is:

1. A resistive device comprising:
   a housing filled with fluid so as to serve as a fluid sump;
   a variable capacity hydraulic device disposed in said housing, said hydraulic device including a capacity controlling mechanism, said capacity controlling mechanism including
      an operation portion extended out of the housing, and
      a spring which elastically biases said hydraulic device toward a neutral position when no external force is applied onto said operation portion;
   a hollow member mounted on said housing;
   a piston slidably fitted in said hollow member so as to be operatively connected to said capacity controlling mechanism; and
   fluid hermetically filled in said hollow member and moved by compressing action of said piston.

2. The resistive device as set forth in claim 1, wherein said fluid in said hollow member is held in said hollow member so as to be prevented from flowing to said fluid sump of said housing.

3. The resistive device as set forth in claim 1, wherein said hollow member is inserted into a hole formed in an inside wall of said housing so as to be prevented from escaping from said hole.

4. The resistive device as set forth in claim 3, wherein said fluid in said hollow member is held in said hollow member so as to be prevented from flowing to said fluid sump of said housing.

* * * * *